Dec. 31, 1929.  T. KÜHL  1,741,526

APPLIANCE FOR PHOTOGRAPHING THE INTERIOR OF THE EYE

Filed Feb. 20, 1929

Inventor:
Theodor Kühl

Patented Dec. 31, 1929

1,741,526

UNITED STATES PATENT OFFICE

THEODOR KÜHL, OF JENA, GERMANY, ASSIGNOR TO THE FIRM CARL ZEISS, OF JENA, GERMANY

APPLIANCE FOR PHOTOGRAPHING THE INTERIOR OF THE EYE

Application filed February 20, 1929, Serial No. 341,533, and in Germany February 22, 1928.

The present invention relates to an appliance for photographing the interior of the eye, which is equipped with a camera and an illuminating device. The illuminating device serves for lighting the eye during the focussing of the camera, whereby the eye is compartively long exposed to the light, as well as for illuminating the eye during the short period required for photographing. Therefore by the intensity of the source of light must be so great that it will do for a very short period of exposure. However, in this case it is too intense not to do any damage to the eye during the comparatively long period necessitated for focussing. For such reason, during the focussing of the camera, the intensity must be decreased.

In order to ensure a change as quick as possible from weak to strong illumination in a simple manner, according to the invention, in the passage for the rays of the illuminating device there is provided a sector shutter whose sectors have holes which, when the shutter is closed, altogether form one small aperture through which the light necessary for focussing the image to be photographed is passing. In such a way it is rendered feasible to make use of sector shutters in connection with the appliances in question and without rendering more difficult the attending of the latter.

The said holes may be provided in the pointed ends of all sectors, which cover each other when the shutter is closed, so that the holes come to lie one above the other, thus forming one single aperture of small size. However, also one single hole can be provided in that part of one sector only, which is not covered by another sector.

In order to reduce still more during the focussing the dazzling of the eye to be photographed, it is appropriate to put a smoked glass into the range of the illuminating rays passing through the aperture. When providing this smoked glass sufficiently small, it can be permanently fixed in the passage for the illuminating rays without fearing a weakening worth mentioning of the illumination during the photographing. This weakening of the illumination during the photographing as well as other eventual disturbances caused by the permanent presence of the smoked glass in the passage for the illuminating rays also can be avoided completely when fixing the smoked glass on one of the sectors in such a way that it covers the hole of the same and is turned aside when the shutter is opened.

Figure 1:
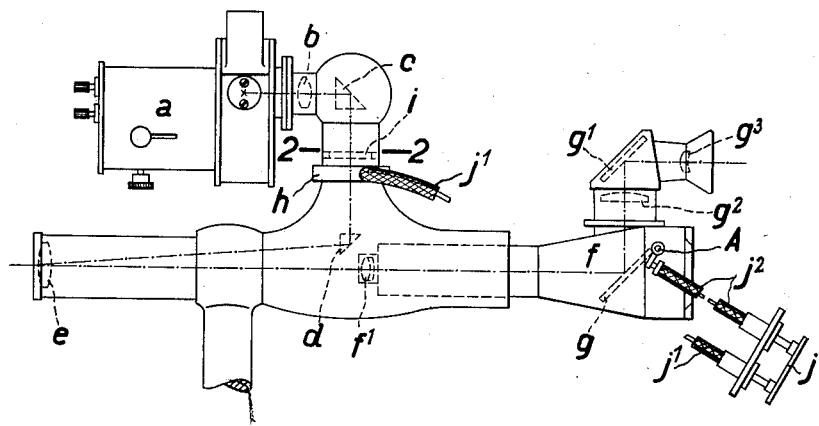

The drawing shows a constructional example of the object of the invention. Fig. 1 represents a front elevation of an appliance with a tightly arranged smoked glass, Fig. 2 a section through the line 2—2 in Fig. 1, and Fig. 3 a section corresponding to the one in Fig. 2 through a constructional example of the appliance having the smoked glass fixed on a sector of the shutter.

Figures 2, 3:
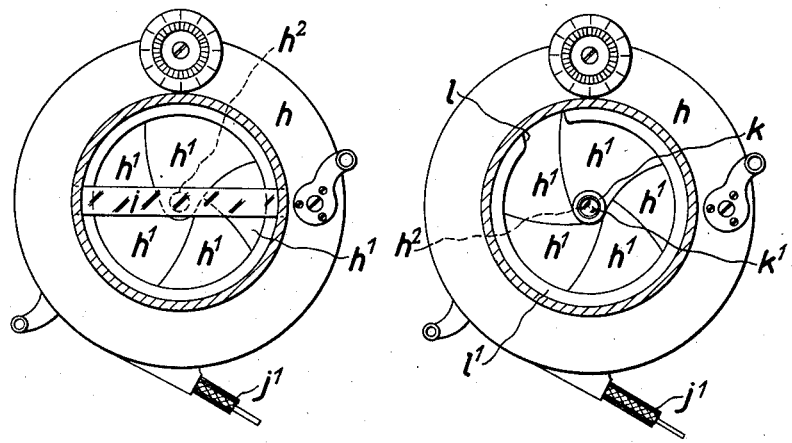

In the appliance according to Figures 1 and 2 an arc lamp $a$ serves as illuminating device from which light is conducted through a lens $b$, two reflecting mirrors $c$ and $d$ and a lens $e$ to the eye to be photographed. A camera $f$ with an objective $f^1$ together with the lens $e$ serve for photographing. The camera $f$ is provided with a mirror $g$ rotatable on an axis A, which mirror together with a second mirror $g^1$ and a lens system $g^2$, $g^3$ serve for focussing the image. In the passage for the rays of the illuminating device there is interposed a sector shutter $h$ whose sectors $h^1$ are provided with holes $h^2$ which are covering one another when the shutter is closed (as represented in the drawing), so that also then still a certain quantity of light can pass through the shutter. In front of the shutter $h$, and cutting the axis of same, there is tightly arranged a stripe of smoked glass $i$ which subdues the light passing through the small opening $h^2$. For actuating the shutter there serves a wire release $j^1$ coupled with a second wire release $j^2$ by means of a bridge $j$ which in its turn serves for allowing the mirror $g$ to be turned away from the passage for the rays of the camera.

In what manner this appliance is attended can be concluded from what is said above. When the shutter $h$ and the mirror $g$ are in the position as shown in the drawing, the appliance is ready for the focussing of the image to be photographed. Then, when a dark slide containing a plate sensible to light is introduced into the camera $f$, the exposure of the plate is effected by pressing the bridge $j$ whereby the mirror $g$ is turned away from the passage for the rays, and immediately thereupon the shutter is opened and closed.

In the appliance altered according to Fig. 3 the tightly arranged strip of smoked glass $i$ is dispensed with. In its stead an annular frame $k$ having a plate of smoked glass $k^1$ arranged in front of the opening $h^2$ of the foremost sector $h^1$, is fixed on the said sector. A hole $l$ in the ring denominated $l^1$ which surrounds the opening of the shutter, allows the smoked glass plate $k^1$ together with the frame to enter the casing of the shutter when this is opened.

I claim:

1. An appliance for photographing the interior of the eye, containing an illuminating device consisting of a source of light and of optical means adapted to pass on the rays coming from the source of light to the eye to be photographed, a camera consisting of a dark chamber and an objective, and a sector shutter arranged in the passage for the rays of the illuminating device, the sectors of the said shutter being provided with holes forming together a small aperture when the shutter is closed.

2. An appliance for photographing the interior of the eye, containing an illuminating device consisting of a source of light and of optical means adapted to pass on the rays coming from the source of light to the eye to be photographed, a camera consisting of a dark chamber and an objective, a sector shutter arranged in the passage for the rays of the illuminating device, the sectors of the said shutter being provided with holes forming together a small aperture when the shutter is closed and a smoked glass arranged in front of the said small aperture.

3. An appliance for photographing the interior of the eye, containing an illuminating device consisting of a source of light and of optical means adapted to pass on the rays coming from the source of light to the eye to be photographed, a camera consisting of a dark chamber and an objective, a sector shutter arranged in the passage for the rays of the illuminating device, the sectors of the said shutter being provided with holes forming together a small aperture when the shutter is closed and a smoked glass attached to one of the said sectors of the shutter, so that it is in front of the said small aperture when the shutter is closed.

THEODOR KÜHL.